United States Patent
Tan

(10) Patent No.: US 11,380,122 B2
(45) Date of Patent: Jul. 5, 2022

(54) FINGERPRINT IDENTIFICATION DEVICE

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 209 days.

(21) Appl. No.: 16/639,608

(22) PCT Filed: May 17, 2019

(86) PCT No.: PCT/CN2019/087482
§ 371 (c)(1),
(2) Date: Feb. 17, 2020

(87) PCT Pub. No.: WO2019/223626
PCT Pub. Date: Nov. 28, 2019

(65) Prior Publication Data
US 2021/0133417 A1 May 6, 2021

(30) Foreign Application Priority Data

May 22, 2018 (CN) .......................... 201810497018.5

(51) Int. Cl.
G06V 40/13 (2022.01)
G02F 1/1335 (2006.01)
G06V 40/12 (2022.01)

(52) U.S. Cl.
CPC .... *G06V 40/1318* (2022.01); *G02F 1/133528* (2013.01); *G06V 40/1324* (2022.01); *G06V 40/1341* (2022.01)

(58) Field of Classification Search
None
See application file for complete search history.

(56) References Cited

U.S. PATENT DOCUMENTS

| 10,078,777 | B2 | 9/2018 | Kim et al. |
| 2007/0171355 | A1 | 7/2007 | Chung |

(Continued)

FOREIGN PATENT DOCUMENTS

| CN | 103576353 A | 2/2014 |
| CN | 103576353 B | 1/2016 |

(Continued)

OTHER PUBLICATIONS

International Search Report and Written Opinion dated Aug. 21, 2019 for PCT Patent Application No. PCT/CN2019/087482.

(Continued)

*Primary Examiner* — Nicholas J Lee
(74) *Attorney, Agent, or Firm* — Thomas | Horstemeyer LLP

(57) ABSTRACT

A fingerprint identification device includes an array substrate, a light emitting unit, a light detection circuit and a light adjusting structure, where the light emitting unit and the light detection circuit are disposed between the array substrate and the light adjusting structure, the light detection circuit is configured to receive light emitted from light emitting unit after being reflected by a user fingerprint and passing through the light adjusting structure; and where the light adjusting structure includes at least a first region and a second region having different refractive indexes, and a refractive index of the first region corresponding to a light receiving range of the light detection circuit is greater than another refractive index of the second region corresponding to outside of the light receiving range of the light detection circuit.

20 Claims, 6 Drawing Sheets

(56) References Cited

U.S. PATENT DOCUMENTS

| | | | |
|---|---|---|---|
| 2018/0060642 A1 | 3/2018 | Kim et al. | |
| 2018/0068166 A1 | 3/2018 | Zeng et al. | |
| 2018/0217430 A1* | 8/2018 | Ding | H01L 27/1214 |
| 2019/0187344 A1 | 6/2019 | Fan | |
| 2020/0160023 A1* | 5/2020 | Hu | G02F 1/13725 |

FOREIGN PATENT DOCUMENTS

| | | |
|---|---|---|
| CN | 105404424 | 3/2016 |
| CN | 106067018 | 11/2016 |
| CN | 106125361 | 11/2016 |
| CN | 106569358 | 4/2017 |
| CN | 107025451 | 8/2017 |
| CN | 107045628 | 8/2017 |
| CN | 107065274 | 8/2017 |
| CN | 107392132 | 11/2017 |
| CN | 107563318 | 1/2018 |
| CN | 107884852 | 4/2018 |
| CN | 107918233 | 4/2018 |
| CN | 107946346 | 4/2018 |
| CN | 108734134 | 11/2018 |

OTHER PUBLICATIONS

1st Office Action dated May 8, 2020 for Chinese Patent Application No. 201810497018.5.
2nd Office Action dated Jul. 21, 2020 for Chinese Patent Application No. 201810497018.5.

* cited by examiner

FINGERPRINT IDENTIFICATION DEVICE

CROSS-REFERENCE TO RELATED APPLICATIONS

This application is a 35 U.S.C. § 371 national phase application of International Patent Application No. PCT/CN2019/087482, filed on May 17, 2019, which claims the benefit of and priority to Chinese Patent Application No. 201810497018.5, filed on May 22, 2018, the entire contents of both of which are incorporated herein by reference.

TECHNICAL FIELD

The present disclosure relates to the field of fingerprint identification, and more particularly, to a fingerprint identification device.

BACKGROUND

With the development of fingerprint identification technology, fingerprint identification has been widely used in many fields. For example, fingerprint identification has been implemented in electronic equipment terminals such as mobile phones, tablet computers and televisions, and security protection systems such as access control and vaults. The implementation of fingerprint collection typically includes optical, capacitive, and ultrasonic imaging technologies. Among them, the identification range of optical fingerprint identification technology is relatively large and the cost is relatively low.

At present, optical fingerprint identification technology used by liquid crystal displays, including mobile terminals such as mobile phones, is still immature. In related art, a fingerprint pattern is usually identified by using backlight to illuminate the finger, which then diffusely reflects the light beam to the photoelectric sensor device. A specific example is shown in FIG. 12. After the backlight is used as the light source to illuminate the finger, the light beam is diffusely reflected by the finger. Part of the light beam will be received by the photoelectric sensor. The diffusely reflected light energy will be different between the light received from the wave valley (referred to as "valley" here below) of the fingerprint and that from the wave peak (referred to as "ridge" here below) thereof, and the light energy corresponding to the valleys is lower than that corresponding to the ridges, thereby performing fingerprint identification based on the difference. However, due to the low transmittance of the liquid crystal layer, the light energy of the backlight beam in the above-mentioned liquid crystal display after passing through the liquid crystal layer twice to the photoelectric sensor is very low, and the photoelectric sensor only receives a small part of light beam diffusely reflected by the finger. In addition, the difference in light energy between the valleys and ridges of the fingerprints are extremely small. At the same time, there is still interference of ambient light between the valleys and ridges of the fingerprints. Therefore, it is very difficult to perform accurate fingerprint identification on the liquid crystal display, and the identification accuracy is low.

It should be noted that the information disclosed in the background section above is only used to enhance the understanding of the background of the present disclosure, and therefore may include information that does not constitute the prior art known to those of ordinary skill in the art.

SUMMARY

The present disclosure is directed to provide a fingerprint identification device, so as to improve the accuracy of fingerprint identification.

According to an aspect of the present disclosure, there is provided a fingerprint identification device, including: an array substrate, a light emitting unit, a light detection circuit and a light adjusting structure, where the light emitting unit and the light detection circuit are disposed between the array substrate and the light adjusting structure, the light detection circuit is configured to receive light emitted from light emitting unit after being reflected by a user fingerprint and passing through the light adjusting structure; and where the light adjusting structure includes at least a first region and a second region having different refractive indexes, and a refractive index of the first region corresponding to a light receiving range of the light detection circuit is greater than another refractive index of the second region corresponding to outside of the light receiving range of the light detection circuit.

According to another aspect of the present disclosure, there is provided a terminal device including the fingerprint identification device described above.

BRIEF DESCRIPTION OF THE DRAWINGS

The above and other features and advantages of the present disclosure will become more apparent by describing its exemplary embodiments in detail with reference to the accompanying drawings. Understandably, the drawings in the following description are merely some embodiments of the present disclosure. For those of ordinary skill in the art, other drawings can be obtained based on these drawings without creative efforts. In the drawings.

DETAILED DESCRIPTION

Figure 1:
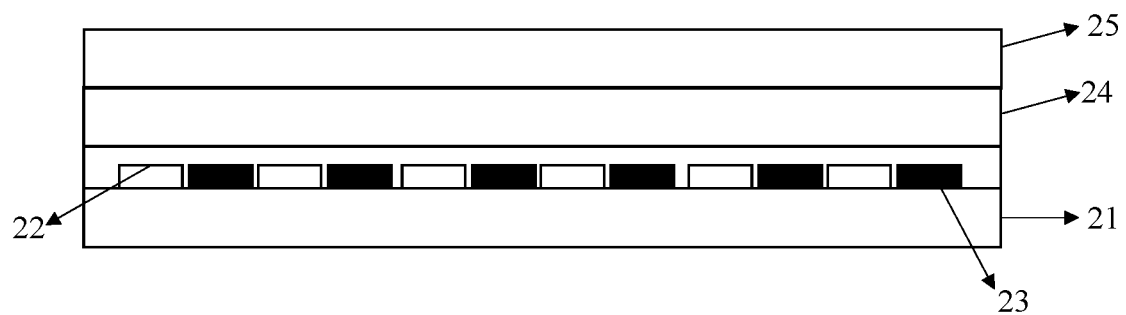
FIG. 1 illustrates a schematic structural diagram of a fingerprint identification device according to an exemplary embodiment of the present disclosure.

Exemplary embodiments will now be described more fully with reference to the accompanying drawings. However, the exemplary embodiments can be implemented in various forms and should not be construed as limited to the embodiments set forth herein. Instead, these embodiments are provided so that the disclosure will be thorough and complete, and will fully convey the concept of exemplary embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or by using other methods, components, materials, devices, steps and the like. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings identify the same or similar parts, and thus repeated descriptions thereof will be omitted.

FIG. 1 illustrates a schematic side-view structural diagram of a fingerprint identification device according to an exemplary embodiment of the present disclosure. The fingerprint identification device includes an array substrate 21, a plurality of light emitting units 22, a light detection circuit 23, a polarizer 24, and a light adjusting structure 25.

The plurality of light emitting units 22 are disposed on the array substrate 21. The light detection circuit 23 is disposed on the array substrate 21 and dispersed in a gap between the plurality of light emitting units 22. The polarizer 24 is disposed on the array substrate 21. The light adjusting structure 25 is disposed on the polarizer 24. The light adjusting structure 25 generates different refractive indexes, and a refractive index of the light adjusting structure corresponding to a light receiving range of the light detection circuit 23 is greater than another refractive index of the light adjusting structure outside the light receiving range of the light detection circuit 23.

According to the fingerprint identification device provided by embodiments of the present disclosure, a light adjusting structure is disposed on the polarizer and generates different refractive indexes, where a refractive index of the light adjusting structure corresponding to a light receiving range of the light detection circuit is greater than another refractive index of the light adjusting structure outside the light receiving range of the light detection circuit. In this way, light incident at a large angle will be deflected to exit in the horizontal direction to reduce the influence of interference light on the light detection circuit. Light incident directly above the light detection circuit will be restricted to propagate in the vertical direction of the light adjusting structure, thereby increasing the light intensity received directly above the light detection circuit, reducing interference, and improving the accuracy of fingerprint identification.

In addition, according to the solution provided by the present disclosure, the light detection circuit is dispersed in the gap between the plurality of light emitting units, that is, the light detection circuit and the light emitting units are disposed on the same layer, thereby reducing the size (e.g., thickness) of the fingerprint identification device and further increasing the integration of the fingerprint identification device.

Figure 2:
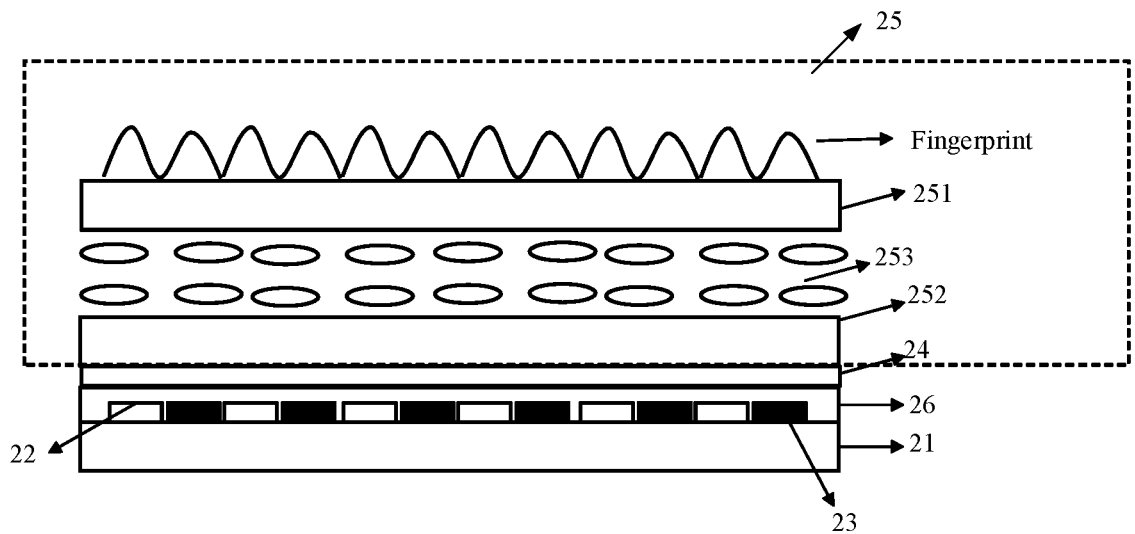
FIG. 2 illustrates a schematic structural diagram of a fingerprint identification device according to an exemplary embodiment of the present disclosure.

FIG. 2 illustrates a schematic side-view structural diagram of a fingerprint identification device according to an exemplary embodiment of the present disclosure. In the embodiment, the light adjusting structure 25 includes an upper substrate 251, a lower substrate 252, and a liquid crystal layer 253 sandwiched between the upper substrate 251 and the lower substrate 252. The upper substrate 251 is configured to receive a user fingerprint. The light adjusting structure 25 further includes the polarizer 24, which is disposed on the array substrate 21.

The plurality of light emitting units 22 and the light detection circuit 23 are provided in a packaging layer 26.

In this light adjusting structure, the polarizer may be a linear polarizer, for example, a $+\lambda/4$ retarder, and may be disposed between the packaging layer 26 and the lower substrate 252. The light transmission axis of the polarizer may be parallel to the long axis of the liquid crystal molecules.

Figure 3:
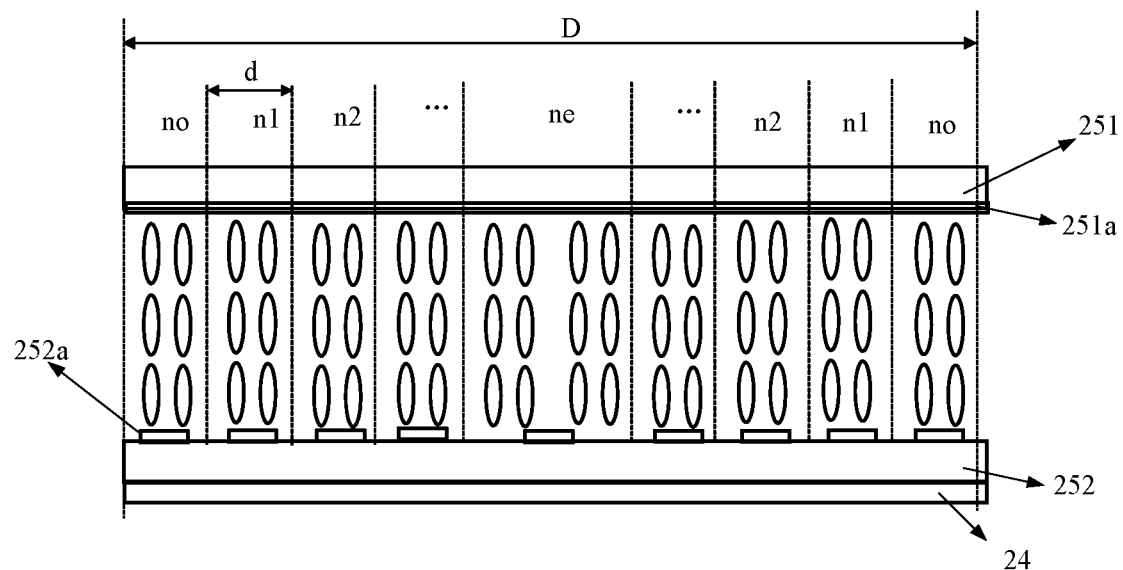
FIG. 3 illustrates a schematic diagram of upper and lower electrodes in a fingerprint identification device according to an exemplary embodiment of the present disclosure.

The lower substrate 252 may be provided thereon with a plurality of separated lower electrodes 252a, and the upper substrate 251 may be provided thereon with an upper electrode 251a, as shown in FIG. 3. The lower electrodes 252a and the upper electrode 251a are configured to form a vertical electric field, and the liquid crystal is initially vertically aligned. It may further include a driving circuit (not shown in the drawing) connected to the upper electrode 251a and the lower electrodes 252a, respectively, which is configured to apply a voltage to the upper electrode 251a and the lower electrodes 252a respectively, causing the liquid crystals to form different deflections. The driving circuit may be various devices or circuits for applying a voltage to drive deflection of the liquid crystal, and may be, for example, an integrated circuit (IC) or the like that applies an electrical signal.

Figure 5:
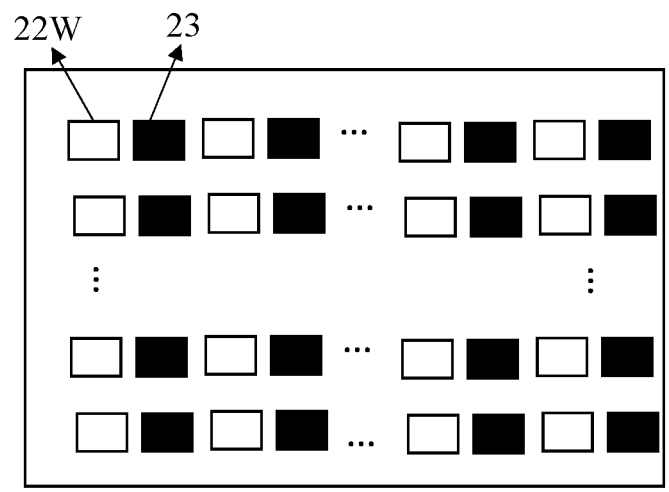
FIG. 5 illustrates another arrangement of light emitting units and light detection circuits according to an exemplary embodiment of the present disclosure.

According to an exemplary embodiment of the present disclosure, the plurality of light emitting units may include a plurality of white light emitting devices, and a plurality of light detection circuits are provided in a gap between the plurality of white light emitting devices on the array substrate. FIG. 5 illustrates an arrangement of light emitting units and light detection circuits according to an exemplary embodiment of the present disclosure. As shown in FIG. 5, a plurality of white light emitting devices (e.g., white LEDs) 22W are arranged in an array, and a plurality of light detection circuits (e.g., photosensitive sensor) 23 are provided in a gap between the white light emitting devices 22W.

Figure 4:
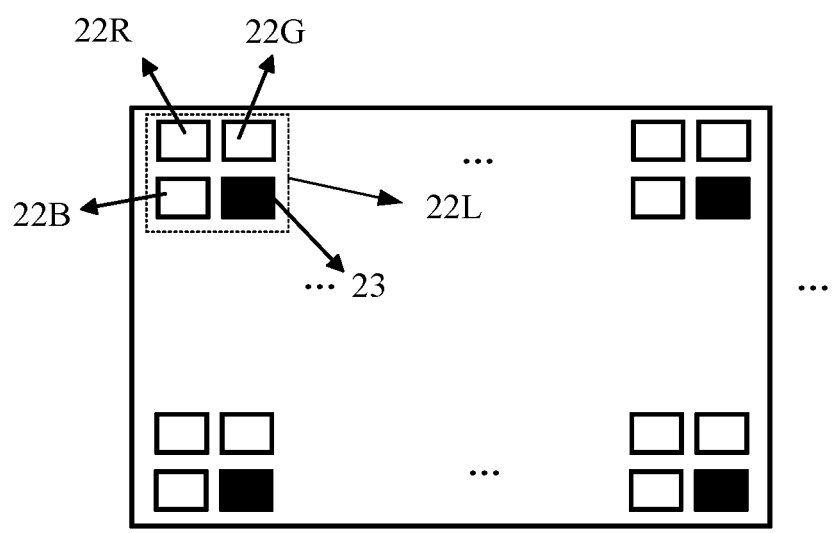
FIG. 4 illustrates an arrangement of light emitting units and light detection circuits according to an exemplary embodiment of the present disclosure.

According to another exemplary embodiment of the present disclosure, the plurality of light emitting units include a plurality of light emitting sets, each of the light emitting sets includes a red light emitting device, a green light emitting device, and a blue light emitting device. One light detection circuit is disposed in a gap of each set on the array substrate. FIG. 4 illustrates an arrangement of light emitting units and light detection circuits according to an exemplary embodiment of the present disclosure. As shown in FIG. 4, the plurality of light emitting units include a plurality of light emitting sets 22L, each light emitting set includes a red light emitting device 22R (e.g., a red LED), a green light emitting device 22G (e.g., a green LED), and a blue light emitting device 22B (e.g., a blue LED). In the gap of each set 22L, a light detection circuit 23 (e.g., a photosensitive sensor) is arranged.

It should be noted that, in the embodiments of the present disclosure, the light emitting units may be implemented by various light emitting devices, for example, an organic light emitting diode (OLED) may be adopted, and the present disclosure is not limited thereto.

In the embodiments of the present application, as valleys and ridges of the fingerprint have different reflectance for incident light, the purpose of fingerprint identification can be achieved according to the difference of light intensity received by the detection unit.

The working principle of the fingerprint identification device in the embodiments of the present disclosure will be described in detail below.

During normal display, that is, when the fingerprint identification function is not needed, the liquid crystal in the light adjusting structure is arranged vertically (vertically aligned), and the liquid crystal layer is inactive and is in a sleep state (see FIG. 3).

In an embodiment, the light adjusting structure includes a plurality of active regions (e.g., the multiple layers as shown in FIGS. 6, 7, 9 and 10), and each active region may have a projection on the array substrate corresponding to one light detection circuit. The active region may be defined with a pixel period D of the light adjusting structure, and each pixel period D satisfies: (the width of the light detection circuit) ≤D≤(the width of the light detection circuit+the width of the light emitting unit), and the size of D may be determined according to a process limit for the width of electrode slit and the required number of layers having different refractive indexes. In an embodiment, a width d of each layer of refractive index may substantially correspond to a size of each lower electrode 252a.

Figure 6:
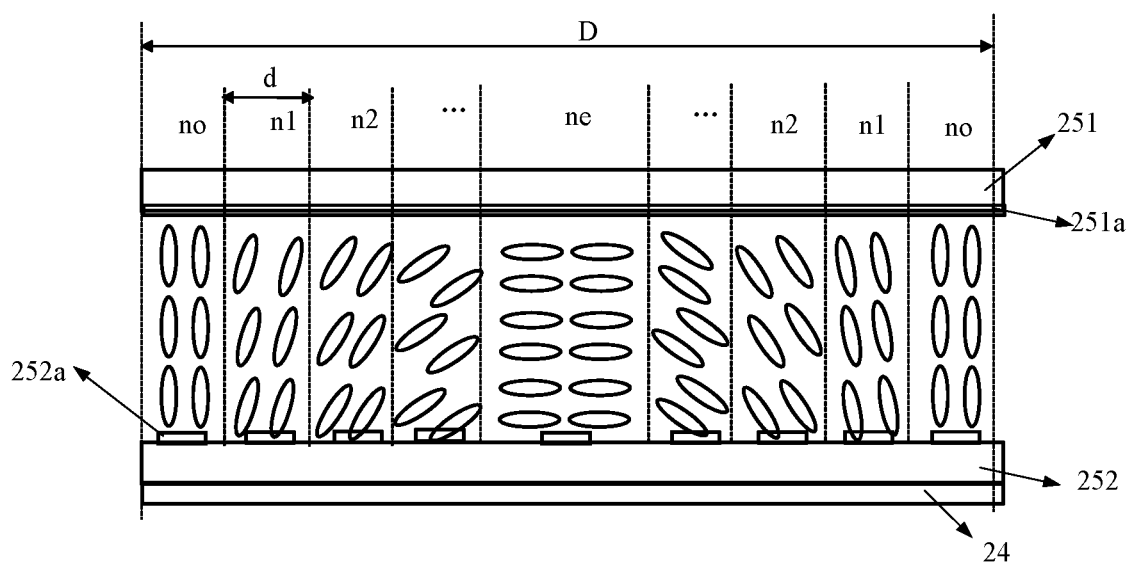
FIG. 6 illustrates a deflection state of liquid crystal.
Figure 7:
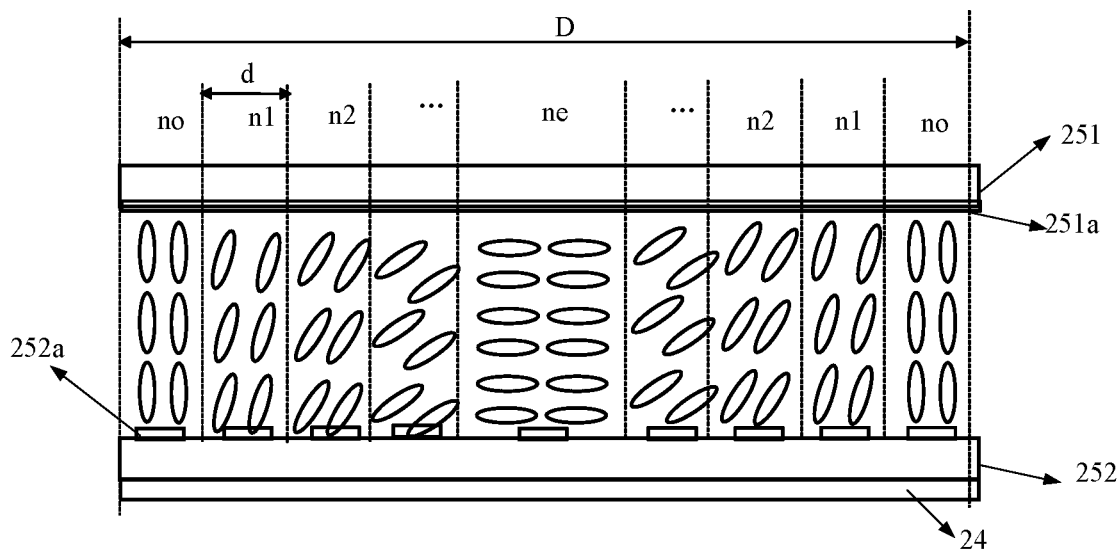
FIG. 7 illustrates another deflection state of liquid crystal.

When the fingerprint identification function is turned on (see FIG. 6), the voltage signal of the upper electrode on the upper substrate is fixed, and different pixel voltages are applied to the lower electrodes of the upper substrate and the lower substrate, so as to realize a symmetrical deflection of liquid crystal as shown in FIG. 6, or a mirrored deflection of liquid crystal as shown in FIG. 7.

Through different deflections of the liquid crystal, within each pixel period D in the light adjusting structure, it can be formed that the refractive indexes are large in the middle and small at both sides. Specifically, within each pixel period D, the refractive index of the light adjusting structure corresponding to a light receiving range of the light detection circuit is greater than the refractive index of the light adjusting structure outside the light receiving range of the light detection circuit.

Figure 8:
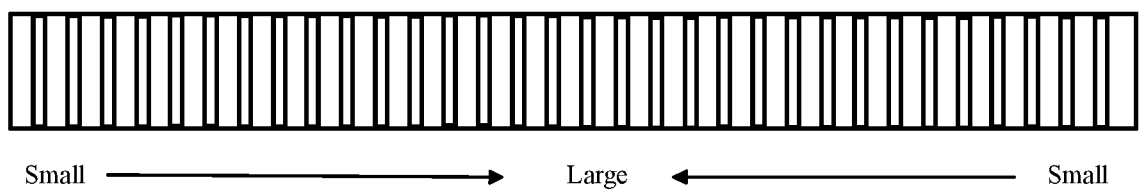
FIG. 8 illustrates a schematic diagram of a refractive index of a liquid crystal layer in a light adjusting structure.

One pixel period D may correspond to one light detection circuit. For example, referring to FIG. 6 and FIG. 7, in the center part of one pixel period D, the refractive index is ne, exemplarily about 1.9, the refractive index at the edge part of one pixel period is no, exemplarily about 1.5, and a transition region between the edge part and the center part forms therein a gradient of refractive indexes n1, n2, . . . . FIG. 8 illustrates a schematic diagram of a refractive index of a liquid crystal layer in the light adjusting structure.

Figure 9:
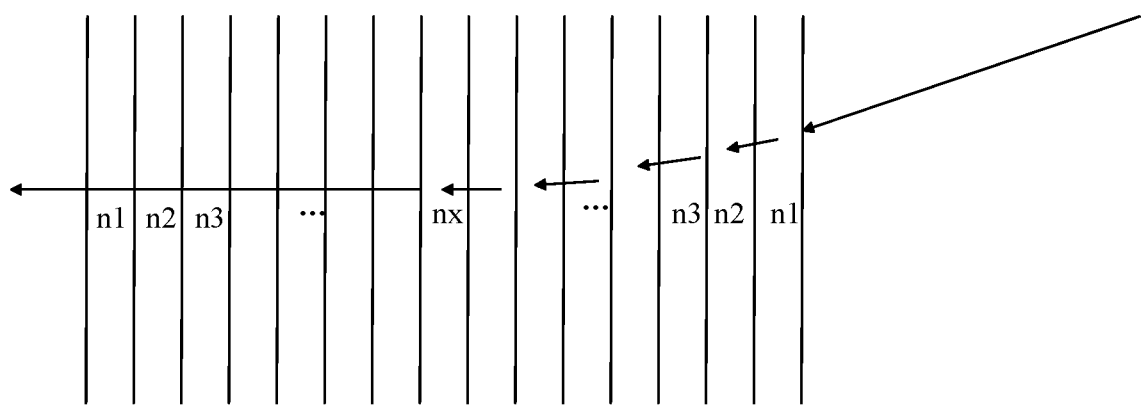
FIG. 9 illustrates a schematic diagram of an optical path of a large-angle incident light beam passing through a light adjusting structure.

FIG. 9 illustrates a schematic diagram of an optical path of a large-angle incident light beam passing through the light adjusting structure. It can be understood from the optical path shown in FIG. 9 that the fingerprint identification device provided by the present disclosure can refract large-angle incident light. Referring to FIG. 9, the principle of deflection of a light beam in a gradient index substrate can be used, wherein the refractive index distribution of the medium is n1<n2<n3 . . . <nx. When the light beam goes from an optically sparse medium to an optically dense medium, the angle between refracted beam and the interface normal gradually decreases, and the reflection and total reflection of the beam at the interface of the mediums are suppressed because the refractive index changes continuously, the beam is always refracted and emitted.

Figure 10:
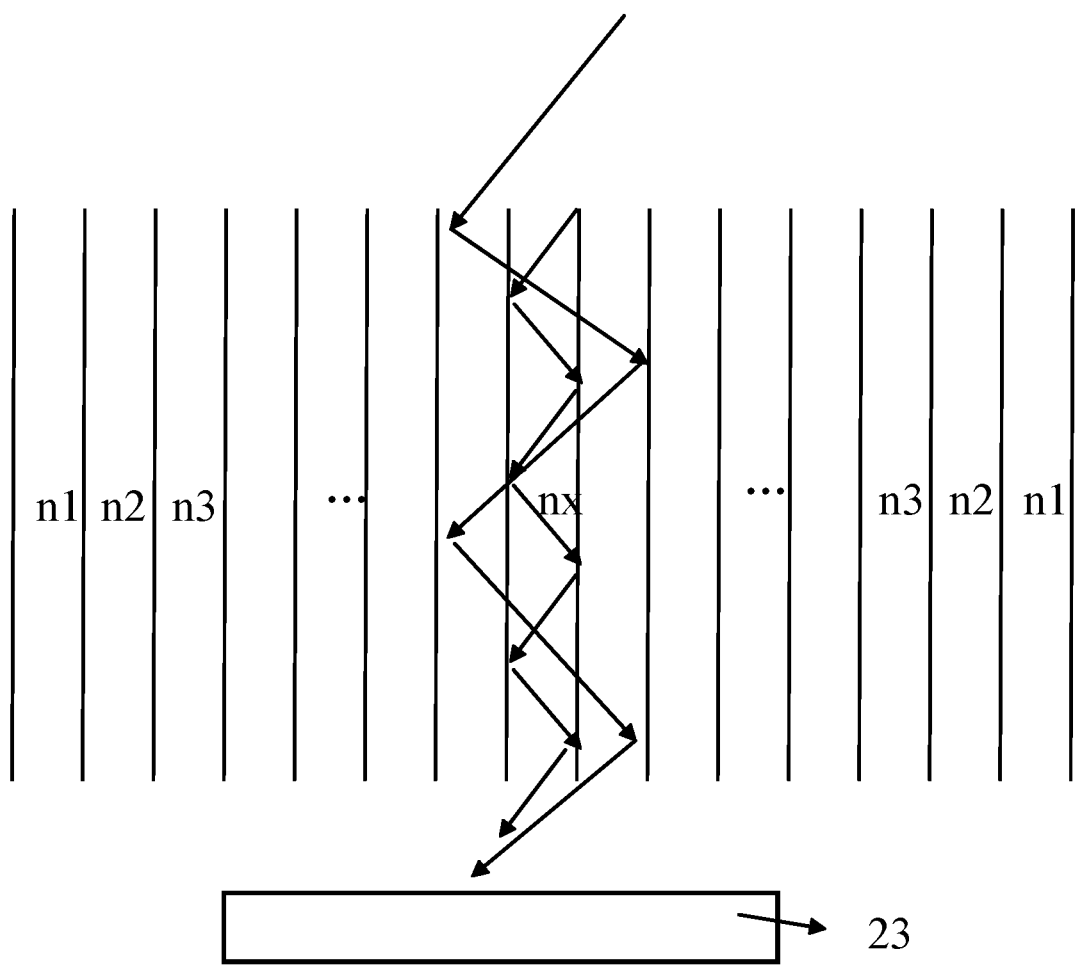
FIG. 10 illustrates a schematic diagram of an optical path of a small-angle incident light beam passing through a light adjusting structure.

FIG. 10 illustrates a schematic diagram of an optical path of a small-angle incident light beam passing through the light adjusting structure. Because the refractive index is the largest at the middle part of the gradient refractive index material, the light incident from directly above will be limited, according to the angle of incidence, within one or more middle layers for total reflection propagation, ensuring that the light detection circuit only receives a part of the light that incident directly above it.

Figure 11:
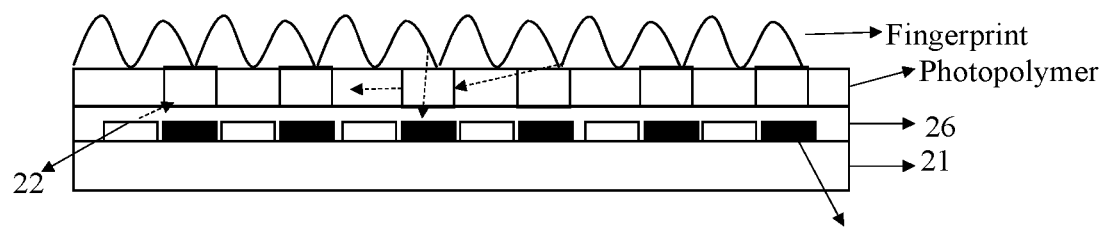
FIG. 11 illustrates a schematic diagram of an optical effect of a fingerprint detection device provided by an embodiment of the present disclosure.
Figure 12:
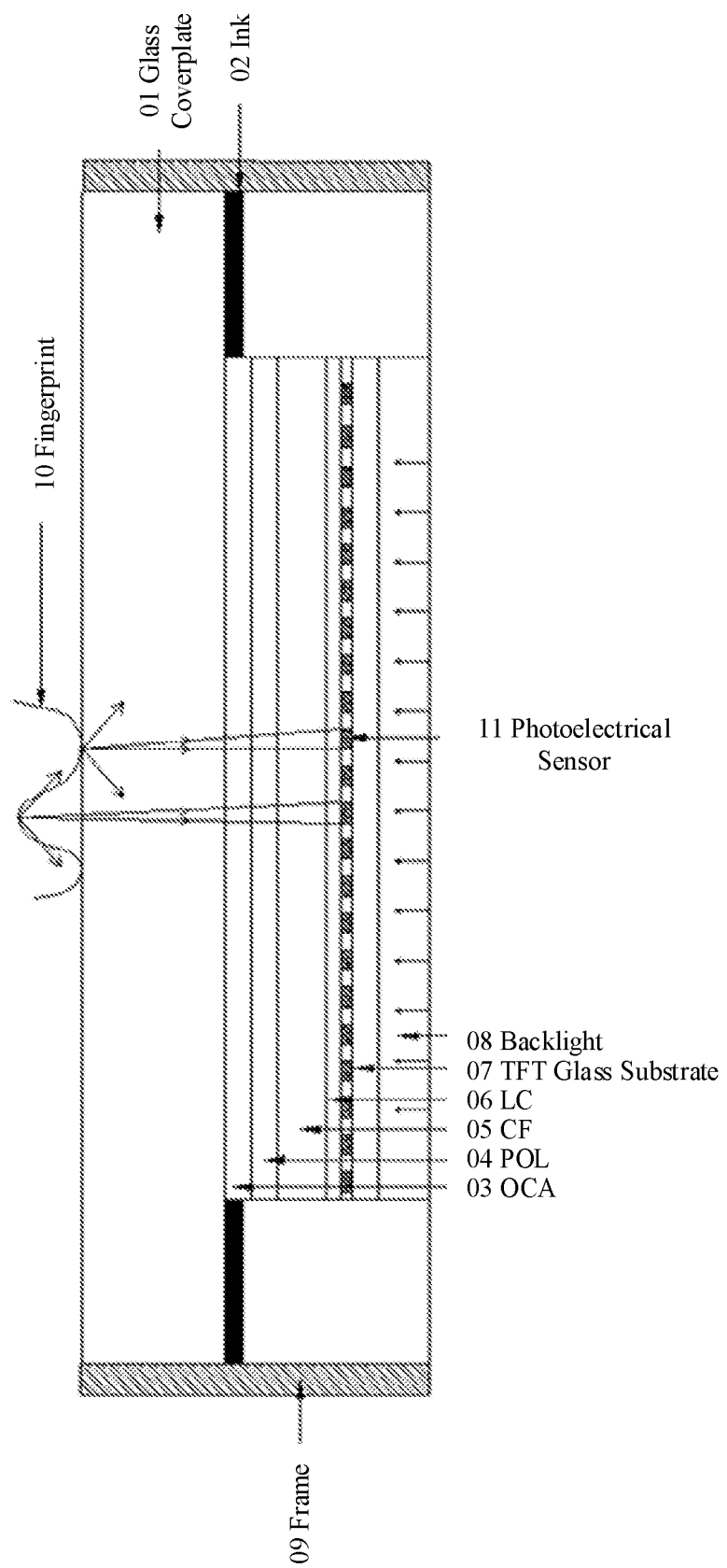
FIG. 12 illustrates a schematic diagram of an optical fingerprint identification device in related art.

FIG. 11 illustrates a schematic diagram of an optical effect of a fingerprint detection device provided by an embodiment of the present disclosure, in which the dotted lines indicate light beams.

In the present disclosure, a light adjusting structure is formed above the packaging layer. The light adjusting structure has gradient distributed refractive indexes, that is, the refractive indexes exhibit a distribution of large in the middle and small at both sides. For light incident at a large angle, it will be deflected to the horizontal direction and emitted out, thereby reducing the effect of interference light on the light detection circuit. For the light incident directly above, it will be limited to propagate in the vertical direction of the gradient index material, thereby increasing the intensity of light received by the light detection circuit from directly above.

According to the embodiments of the present disclosure, optical fingerprint identification is performed using only light that satisfies the above-mentioned conditions, and the light that does not meet the above conditions will not be limited within the waveguide. But the latter part of light may be received by the light detection circuit through refraction and reflection of each film layer. Since this part of stray light always exists, a clearance correction may be performed after the fingerprint identification device structure is formed. For example, the stray light received by the light detection circuit can be recorded before fingerprint identification, that is, the value difference between valleys and ridges of the fingerprint can be identified based on the stray light intensity.

In the embodiments of the present disclosure, the light detection circuit is provided between the light emitting units. Due to the reflectivity difference between valleys and ridges of the fingerprint to the incident light, fingerprint identification can be achieved according to the difference in light intensity received by the light detection circuit.

The light adjusting structure is provided above the light detection circuit. Different voltages can be applied to different positions of the liquid crystal layer to achieve different deflection angles of the liquid crystal, thereby achieving different refractive indexes (change from no to ne) of the liquid crystal layer to incident polarized light. The refractive indexes to incident polarized light exhibit a distribution of large in the middle and small at both sides. For light incident at a large angle, it will be deflected to the horizontal direction and emitted out, thereby reducing the effect of interference light on the light detection. For the light incident directly above, it will be limited to propagate in the vertical direction of the gradient index material, thereby increasing the intensity of light received by the light detection circuit from directly above. Therefore, the fingerprint identification device provided by the embodiments of the present disclosure can reduce interference and improve the accuracy of fingerprint identification.

Those skilled in the art will readily contemplate other embodiments of the present disclosure taking into consideration the specification and practicing the invention disclosed herein. The present application is intended to cover any variations, uses, or adaptations of this disclosure that conform to the general principles of this disclosure and include the common general knowledge or conventional technical means in the technical field not disclosed by this disclosure. The specification and examples are intended to be considered as exemplary only, and the protection scope and spirit of the disclosure are indicated by the following claims.

What is claimed is:

1. A fingerprint identification device, comprising an array substrate, a light emitting unit, a light detection circuit, and a light adjusting structure, wherein:
   the light emitting unit and the light detection circuit are disposed between the array substrate and the light adjusting structure, the light detection circuit being configured to receive light emitted from light emitting unit after being reflected by a user fingerprint and passing through the light adjusting structure; and
   the light adjusting structure generates different refractive indexes, a refractive index of the light adjusting structure corresponding to a light receiving range of the light detection circuit being greater than another refractive index of the light adjusting structure outside the light receiving range of the light detection circuit.

2. The fingerprint identification device according to claim 1, wherein:
   the light adjusting structure comprises an upper substrate, a lower substrate, and a liquid crystal layer sandwiched between the upper substrate and the lower substrate; and
   the upper substrate is configured to receive the user fingerprint.

3. The fingerprint identification device according to claim 2, wherein a plurality of separate lower electrodes are provided on the lower substrate and an upper electrode is provided on the upper substrate.

4. The fingerprint identification device according to claim 3, further comprising a driving circuit connected to the upper electrode and one of the separate lower electrodes, respectively, and configured to apply a voltage to the upper electrode and the one of the separate lower electrodes, respectively, causing liquid crystals in the liquid crystal layer to form different deflections.

5. The fingerprint identification device according to claim 4, wherein:
   the light adjusting structure comprises a plurality of active regions, each of the active regions having a projection on the array substrate corresponding to the light detection circuit, and each of the active regions comprising a central region corresponding to a center of the light receiving range and an edge region corresponding to the outside of the light receiving range; and
   the driving circuit is configured to cause the different deflections to be formed such that liquid crystal deflections in the edge region is in a symmetrical distribution or a mirrored distribution with respect to the central region.

6. The fingerprint identification device according to claim 2, wherein the light adjusting structure further comprises a polarizer disposed between the lower substrate and the light detection circuit.

7. The fingerprint identification device according to claim 6, wherein a light transmission axis of the polarizer is parallel to a long axis of liquid crystal molecules in the liquid crystal layer.

8. The fingerprint identification device according to claim 1, wherein the light adjusting structure comprises a plurality of active regions, each of the active regions having a projection on the array substrate corresponding to the light detection circuit.

9. The fingerprint identification device according to claim 8, wherein each of the active regions comprises:
   a central region corresponding to a center of the light receiving range; and
   an edge region corresponding to the outside of the light receiving range, wherein the central region has a refractive index greater than the edge region.

10. The fingerprint identification device according to claim 9, wherein each of the active regions further comprises a transition region between the central region and the edge region, wherein a refractive index of the transition region is in a gradient distribution along a direction from the central region to the edge region.

11. The fingerprint identification device according to claim 1, wherein:
    the light emitting unit is one of a plurality of light emitting units; and
    the light detection circuit is one of a plurality of light detection circuits disposed on the array substrate, the plurality of light detection circuits being dispersed within a gap between the plurality of light emitting units.

12. The fingerprint identification device according to claim 11, wherein the plurality of light emitting units comprise a plurality of white light emitting devices.

13. The fingerprint identification device according to claim 11, wherein the plurality of light emitting units comprise a plurality of light emitting sets, each of the light emitting sets comprising a red light emitting device, a green light emitting device, and a blue light emitting device, and individual ones of the light detection circuits being provided in a gap of each of the light emitting sets.

14. The fingerprint identification device according to claim 11, wherein the plurality of light emitting units and the plurality of light detection circuits are provided in a packaging layer.

15. The fingerprint identification device according to claim 1, wherein the light detection circuit comprises a photosensitive sensor.

16. A terminal device, comprising:
    a fingerprint identification device comprising an array substrate, a light emitting unit, a light detection circuit, and a light adjusting structure, wherein:
       the light emitting unit and the light detection circuit are disposed between the array substrate and the light adjusting structure, the light detection circuit being configured to receive light emitted from light emitting unit after being reflected by a user fingerprint and passing through the light adjusting structure; and
       the light adjusting structure comprises at least a first region and a second region having different refractive indexes, a refractive index of the first region corresponding to a light receiving range of the light detection circuit being greater than another refractive index of the second region corresponding to outside of the light receiving range of the light detection circuit.

17. The fingerprint identification device according to claim 16, wherein:
    the light adjusting structure comprises an upper substrate, a lower substrate, and a liquid crystal layer sandwiched between the upper substrate and the lower substrate; and the upper substrate is configured to receive the user fingerprint.

18. The fingerprint identification device according to claim 16, wherein the light adjusting structure comprises a plurality of active regions, each of the active regions having a projection on the array substrate corresponding to the light detection circuit.

19. The fingerprint identification device according to claim 16, wherein:
   the light emitting unit is one of a plurality of light emitting units; and
   the light detection circuit is one of a plurality of light detection circuits disposed on the array substrate, wherein the plurality of light detection circuits are dispersed within a gap between the plurality of light emitting units.

20. The fingerprint identification device according to claim 16, wherein the light detection circuit comprises a photosensitive sensor.

* * * * *